United States Patent [19]

Heidmann et al.

[11] Patent Number: 4,503,947

[45] Date of Patent: Mar. 12, 1985

[54] DISC BRAKE AND PROTECTIVE BOOT THEREFOR

[75] Inventors: Kurt R. Heidmann, Fairview Park; Andrew Marsh, Elyria, both of Ohio

[73] Assignee: Allied Corporation, Morristown, N.J.

[21] Appl. No.: 438,143

[22] Filed: Nov. 1, 1982

[51] Int. Cl.³ .................................... F16D 55/224
[52] U.S. Cl. ................................ 188/72.8; 74/18.2; 92/168; 188/71.1; 188/370; 277/9; 277/153; 277/212 FB
[58] Field of Search ............... 188/72.1, 73.31, 72.8, 188/71.1, 370; 74/18.2; 277/212 FB, 153, 152, 9.5, 9, DIG. 4; 92/168; 403/50, 51

[56] References Cited

U.S. PATENT DOCUMENTS

| | | | |
|---|---|---|---|
| 3,490,343 | 1/1970 | Afanador et al. | 74/18.2 X |
| 3,528,301 | 9/1970 | Wasmer | 74/18.2 |
| 4,022,300 | 5/1977 | Afanador et al. | 188/72.1 |
| 4,199,159 | 4/1980 | Evans | 277/212 FB |
| 4,270,442 | 6/1981 | Bainard et al. | 92/168 |

FOREIGN PATENT DOCUMENTS

| | | | |
|---|---|---|---|
| 3111576 | 3/1982 | Fed. Rep. of Germany | 92/168 |
| 1239885 | 7/1971 | United Kingdom | 74/18.2 |
| 2083576 | 3/1982 | United Kingdom | |

Primary Examiner—Duane A. Reger
Assistant Examiner—Michael P. Gilday
Attorney, Agent, or Firm—Ken C. Decker; W. N. Antonis

[57] ABSTRACT

The open bore of a disc brake caliper assembly is protected by a resilient boot and retainer assembly (92). The piston (38) which forces the friction elements (26, 32) against the friction faces (14, 16) of the rotor (12) is provided with a circumferentially extending groove (118) which receives the bead (96) circumscribing one end of the boot (94). The bead (98) circumscribing the other end of the boot (94) is clamped against a land (122) of the piston 38 by a boot retainer (110). The boot retainer (110) is provided with a radially projecting portion (112) which is held against a circumferentially extending face (108) on the wall of the caliper housing (22) by the oil seal (116). Accordingly, the boot (94) may be removed and a new one installed when the brake is serviced without disassembly of the caliper assembly by withdrawing the piston (38) until the groove (118) is brought into registry with the projection (106), thereby permitting removal of the old boot and installation of a new one.

4 Claims, 2 Drawing Figures

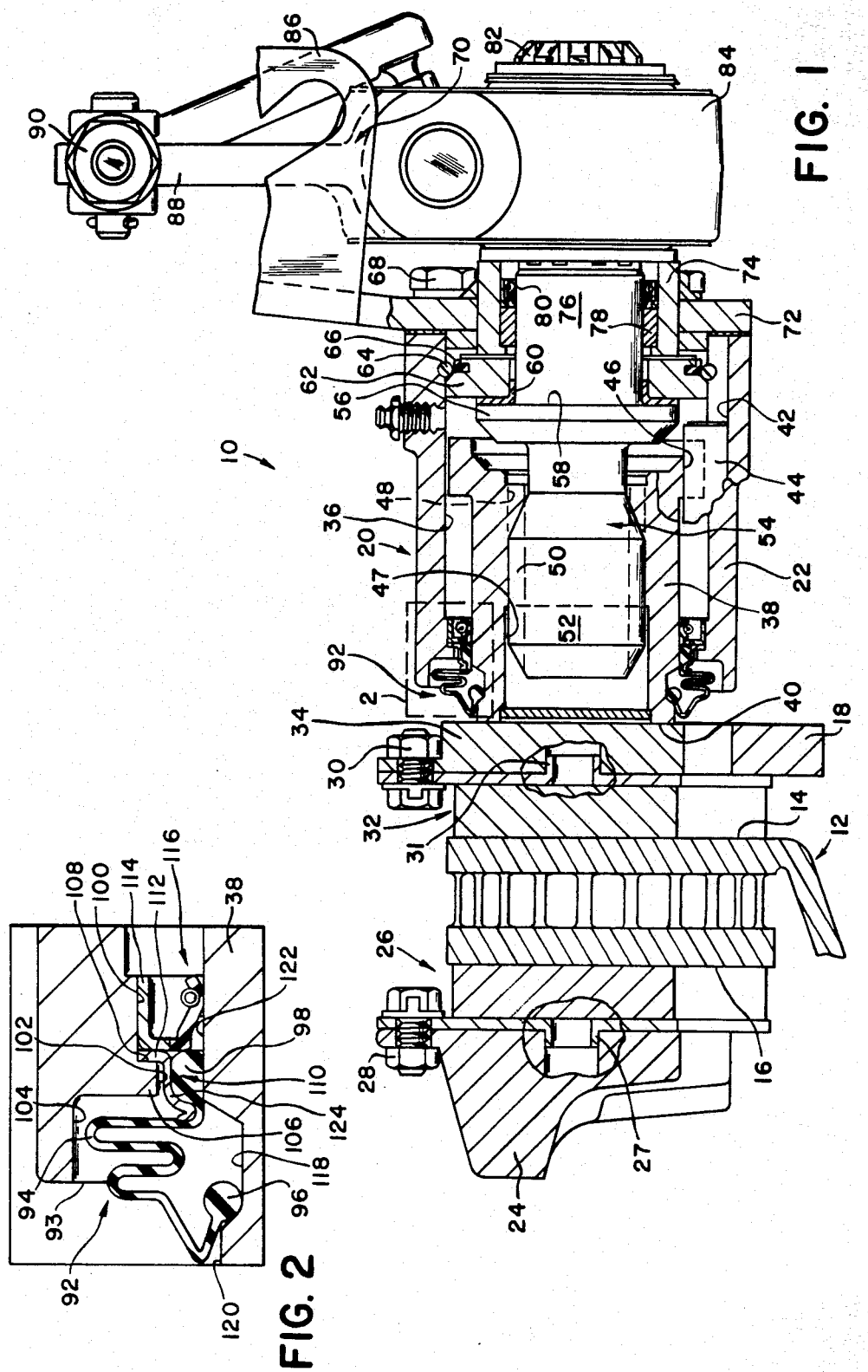

DISC BRAKE AND PROTECTIVE BOOT THEREFOR

This invention relates to a disc brake and protective boot and retainer therefor.

Disc brakes and protective boots therefor have been proposed before. These devices are the type comprising a rotor mounted for rotation with a member to be braked and presenting a pair of opposed friction faces, a pair of friction elements mounted adjacent said friction faces for engagement with the friction faces when a brake application is effected, a caliper assembly operably connected to the friction elements for forcing the latter into frictional engagement with the friction faces, the caliper assembly including a housing, a piston slidably mounted in the housing, actuating means for urging the piston toward and away from the rotor for causing the friction elements to move into and away from frictional engagement with the friction faces, and a flexible boot extending between the housing and the piston. For example, U.S. Pat. No. 4,199,159, issued Apr. 22, 1980 to Evans, discloses a protective boot for a disc brake assembly. Such protective boots are normally manufactured from a flexible material, such as rubber, which is relatively easily damaged in use because of the severe environment in which the boot is placed. For example, disc brakes are normally mounted beneath the vehicle where the protective boot is exposed to road debris, salt, water, etc. and are also mounted close to the rotor which heats during a brake application. These factors combine to cause rapid deterioration of the protective boot. Accordingly, the protective boot must usually be replaced when the brake is serviced. However, in the prior art devices, the caliper must usually be disassembled when a new protective boot is installed. Furthermore, the surfaces of the caliper and piston to which the boot is assembled must be machined to relatively tight clearances.

A protective boot made pursuant to the teachings of the present invention avoids the drawbacks of the prior art by permitting removal of a worn boot and installation of a new boot without completely disassembling the caliper. Furthermore, machining of the caliper during manufacture of the caliper assembly is facilitated, because the boot retainer used in the device made pursuant to the present invention establishes critical dimensions, thereby relaxing caliper machining tolerances. Furthermore, the boot used in the present invention is protected by the caliper body.

Accordingly, the present invention is characterized in that the housing, the piston and the boot are each provided with cooperating means to permit removal of the boot from the housing assembly and the piston without removing the piston from the housing assembly.

Other features and advantages will appear in the following description with reference to the accompanying drawings in which FIG. 1 is a longitudinal cross-sectional view of a caliper assembly and actuator therefor made pursuant to the teachings of our present invention; and FIG. 2 is an enlarged cross-sectional view of the circumscribed portion of FIG. 1.

Referring now to the drawings, a disc brake assembly generally indicated by the numeral 10 includes a rotor 12 which is mounted for rotation with the vehicle wheel. Rotor 12 defines oppositely disposed friction faces 14, 16. A torque-taking member 18 is secured to a nonrotating part of the vehicle adjacent the rotor 12 and supports a caliper assembly indicated generally by the numeral 20. The caliper assembly 20 is mounted on the torque-taking member 18 in the manner disclosed in U.S. patent application Ser. No. 375,925 filed May 7, 1982. The caliper assembly 20 includes a housing 22 which includes portions (not shown) straddling the periphery of the rotor 12 and which connect to a radially inwardly extending portion 24 of the housing 22 which is disposed adjacent the friction face 16. Inwardly extending portion 24 supports a friction pad generally indicated by the numeral 26 adjacent the friction face 16. Friction pad 26 is secured to inwardly extending portion 24 by a bolt 28 and projections 27. A corresponding bolt 30 and projections 31 secure another friction pad 32 to a support plate 34 which is slidably mounted on the torque-taking member 18 for movement toward and away from the friction face 14.

The housing 22 defines a bore 36 which slidably receives a piston 38 for movement toward and away from the friction face 14. The end face 40 of the piston 38 engages the support plate 34. The bore 36 is provided with at least one longitudinally extending groove 42 in the annular wall defined by the bore 36 which receives a rod 44 which also engages a corresponding longitudinally extending groove 46 on the outer circumferential surface of the piston 38 in order to prevent relative rotation between the piston 38 and the housing 22. The piston 38 defines an inner circumferential surface 47 which is threaded as at 48 to engage corresponding threads 50 on threaded portion 52 of a power screw 54. Because of the threaded connection with the power screw 54, piston 38 acts as a power nut in the transmission of forces to the friction elements 26, 32. The power screw 54 is provided with a radial projecting portion 56 which defines a thrust surface 58 which circumscribes the power screw 54. An annular, low friction bearing 60 is interposed between the thrust surface 58 and an annular thrust collar 62 which is mounted on the wall of the bore 36 by a retaining ring 64 and takeup ring 66.

Bolts 68 secure a bracket 70 to the end of the housing 22. The bracket 70 includes a cover portion 72 which retains a power screw support portion 74 on the housing 22. Power screw support portion 74 defines an opening through which portion 76 of the power screw 54 extends. A bearing 78 and oil seal 80 support the portion 76 and prevent lubrication from leaking from the bore 36. Portion 76 of power screw 54 terminates in a splined section 82. An automatic slack adjuster 84 of the type shown in U.S. Pat. No. 3,901,357 issued Aug. 26, 1975 to Reitz is mounted on the splined section 82. A conventional fluid pressure actuator (not shown) is mounted on the portion 86 of the bracket 70 and connects with the arm 88 of the slack adjuster 84 by way of yoke 90 and pin 91 so that when the actuator is operated, movement of the arm 88 rotates the power screw 54.

A protective boot and oil seal assembly generally indicated by the numeral 92 prevents contaminants from entering into the bore 36 through the opened end 93 of the housing 22. Boot assembly 92 includes an annular flexible boot 94, one end of which terminates in a circumferentially extending bead 96 and the other end of which terminates in a circumferentially extending bead 98. The bore 36 is counterbored as at 100, 102 and 104. The counterbores cooperate to define a projecting portion 106 which projects from the housing 22 toward the piston 38. The counterbore 104 defines a pocket in which the boot 94 is received to partially protect the latter from the adverse environment in which the disc brake assembly 10 operates. The counterbores 100, 102 cooperate to define a circumferentially extending face 108. An annular boot retainer generally indicated by the numeral 110 is provided with a radially projecting portion 112 which is held against the face 108 by a portion 114 of a conventional oil and grease seal generally indicated by the numeral 116. Portion 114 of the oil seal 116 is engaged with the bore 100 to hold the portion 112 of retainer 110 against the face 108. The piston 38 is provided with a circumferentially extending groove 118 defined between lands 120, 122 on the piston 38. The bead 96 is received in the groove 118. The boot retainer 110 includes a clamping portion 124 which clamps the bead 98 against the land 122 of the piston 38.

In operation, the aforementioned fluid pressure actuator (not shown) strokes the arm 88 of the automatic slack adjuster 84. Because of the splined connection between the slack adjuster 84 and the power screw 54, rotation of the slack adjuster 84 also rotates the power screw 54. Because of the threaded connection between the power screw 54 and the piston 38, and since the piston 38 is prevented from rotating because of the rods 44, rotation of the power screw 54 forces the piston 38 towards the friction face 14, thereby urging the friction pad 32 into frictional engagement with the friction face 14. Movement of the friction pad 32 against the friction face 14 also causes the friction pad 26 to engage with friction face 16, because of the slidable mounting of the caliper on the torque-taking member 18 and because the portion 24 is connected with the housing by bridge portions (not shown) of the housing which extend across the periphery of the rotor 12. Upon release of the brake, the power screw 54 is turned in the reverse direction which, because of the threaded connection between the power screw 54 and the piston 38, causes the latter to withdraw from the friction face 14, thereby releasing the brake.

During normal operation of the disc brake assembly 10, the stroke of the piston 38 is sufficiently small that the bead 98 of the boat 44 remains slidably engaged with the land 122. However, when the brake is serviced, it is usually necessary to replace the boot 94. When this is done, the automatic slack adjuster 84 is "backed off" using the normal manual adjustment feature (not shown) provided conventionally with the slack adjuster 84 as is fully disclosed in the above-identified U.S. Pat. No. 3,901,357. Operation of this manual adjustment feature rotates the power screw in the direction effecting movement of the piston 38 away from the rotor 14. When the piston 38 has moved a sufficient distance that the groove 118 is brought into registry with the projecting portion 106, the old boot 94 and retainer 110 may be removed and a new one installed. The manual adjustment feature of the slack adjuster 84 is then operated to force the piston 38 toward the friction face 14. Because the clamping portion 124 of the boot retainer 110 provides the critical clamping surface for the bead 98, the tolerances to which the counterbores 102, 104 must be machined may be relaxed over the tolerances that would be required if the projecting portion 106 was required to hold the bead against the piston.

We claim:

1. Disc brake comprising a rotor mounted for rotation with a member to be braked and presenting a pair of opposed friction faces, a pair of friction elements mounted adjacent said friction faces for engagement with the friction faces when a brake application is effected, a caliper assembly operatively connected to said friction elements for forcing the latter into frictional engagement with said friction faces, said caliper assembly including a housing, a piston slidably mounted in the housing, actuating means for urging said piston toward and away from said rotor for causing said friction elements to move into and away from frictional engagement with said friction faces, a flexible boot extending between said housing and said piston, said housing, said piston, and said boot each being provided with cooperating means to permit removal of the boot from said housing assembly and said piston without removing said piston from said housing, said cooperating means including a circumferentially extending boot retainer having a first portion engaging said housing and a second portion clamped against said boot, a projecting portion on said housing projecting toward said piston and cooperating with the latter to define a circumferentially extending face, and means holding said first portion of said boot retainer against said face, said holding means including a circumferentially extending member, said first portion being disposed between said face and said circumferentially extending member.

2. Disc brake comprising a rotor mounted for rotation with a member to be braked and presenting a pair of opposed friction faces, a pair of friction elements mounted adjacent said friction faces for engagement with the friction faces when a brake application is effected, a caliper assembly operatively connected to said friction elements for forcing the latter into frictional engagement with said friction faces, said caliper assembly including a housing defining a bore therewithin having an interior wall within said housing, a piston slidably mounted in the bore, actuating means for urging said piston toward and away from said rotor for causing said friction elements to move into and away from frictional engagement with said friction faces, and a flexible boot extending between said interior wall of said bore and said piston; said housing, said piston, and said boot each being provided with cooperating retaining means to permit removal of the boot from said interior wall of the bore and said piston without removing said piston from said housing, said retaining means including a circumferentially extending member mounted within said bore and including a first portion engaged with said interior wall of said bore to prevent movement of the circumferentially extending member with respect to the bore and a second portion yieldably clamping a portion of said boot against said piston, said piston defining a circumferentially extending groove to permit removal of said portion of said boot from said retainer when the groove is moved into registry with said second portion of said circumferentially extending member.

3. Disc brake as claimed in claim 2, wherein a projection extends from the wall of said bore toward said piston, said first portion of the circumferentially extending member being held against said projection.

4. Disc brake as claimed in claim 1, wherein said circumferentially extending member is an oil seal.

* * * * *